C. J. SMITH.
WIRE WORKING IMPLEMENT.
APPLICATION FILED JAN. 20, 1909.
942,017.
Patented Nov. 30, 1909.
2 SHEETS—SHEET 1.
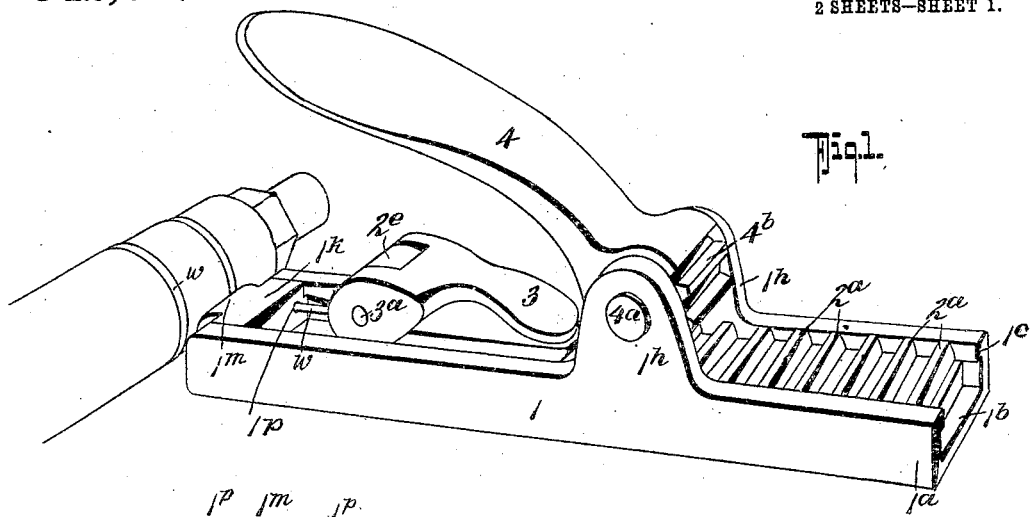
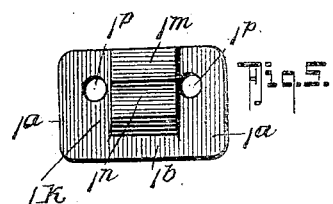
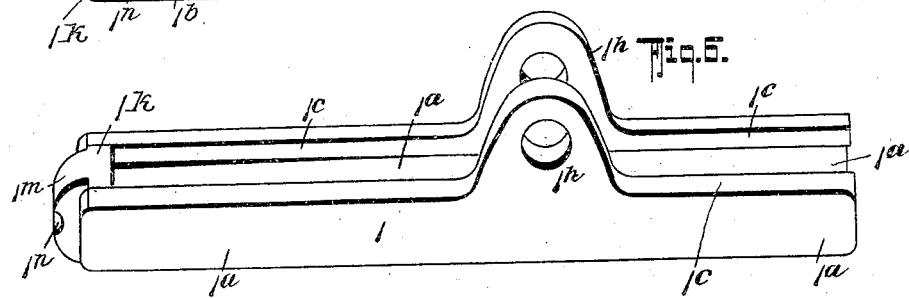
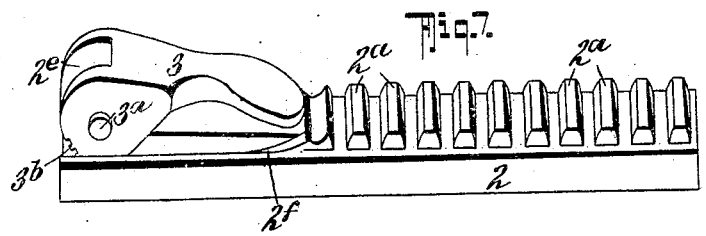
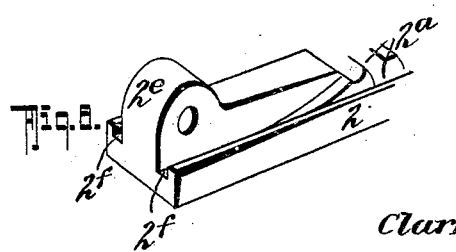
WITNESSES:
Hayward Woodard
Eleanor McCormick
INVENTOR
Clark J. Smith
BY
Fred G. Dieterich & Co
ATTORNEYS C. J. SMITH.
WIRE WORKING IMPLEMENT.
APPLICATION FILED JAN. 20, 1909.
942,017.
Patented Nov. 30, 1909.
2 SHEETS—SHEET 2.
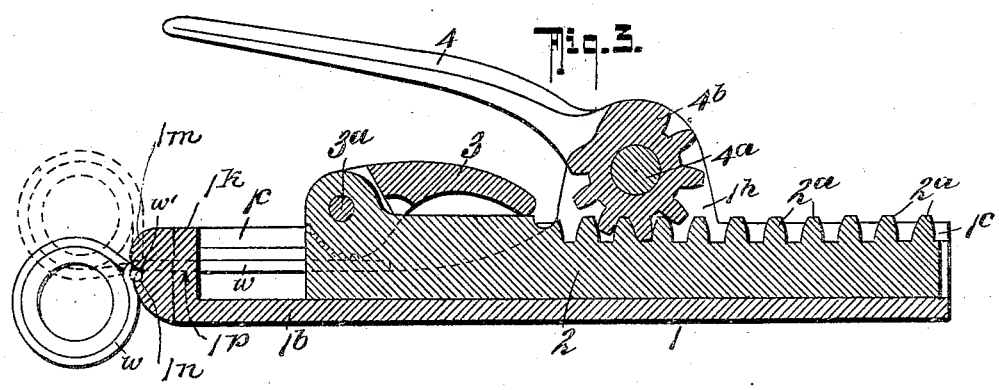
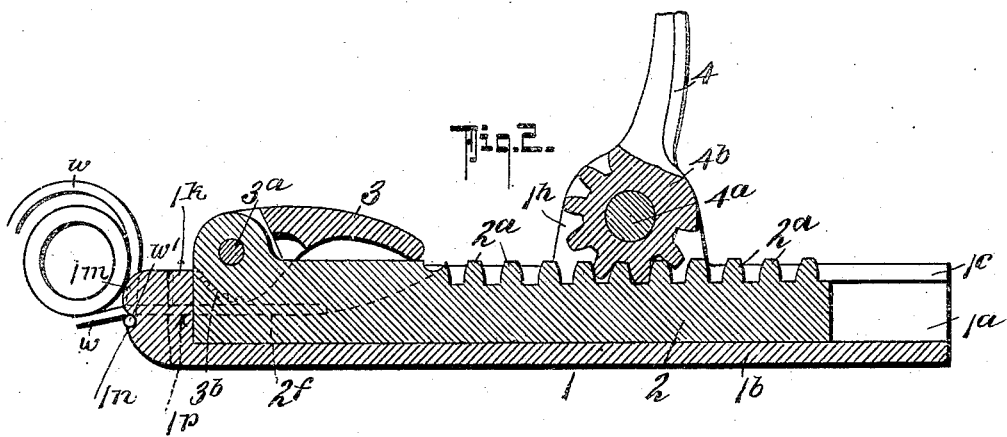
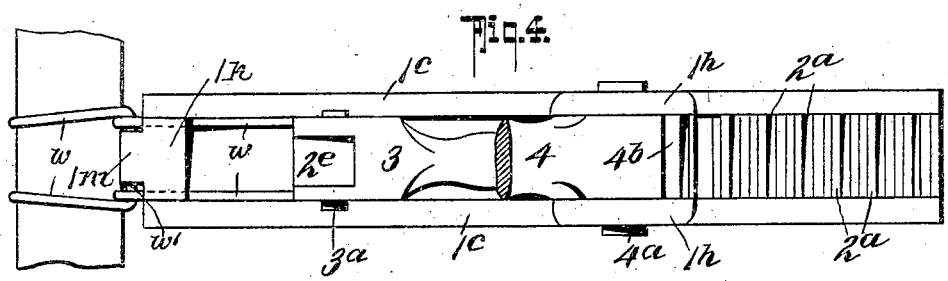
WITNESSES:
Hayward Woodard
Eleanor MacCormick
INVENTOR
Clark J. Smith
BY
Fred G. Dieterich
ATTORNEYS

UNITED STATES PATENT OFFICE.

CLARK JAMES SMITH, OF OTTUMWA, IOWA, ASSIGNOR TO THE HARDSOCG WONDER DRILL CO., INCORPORATED, OF OTTUMWA, IOWA.

WIRE-WORKING IMPLEMENT.

942,017.      Specification of Letters Patent.      Patented Nov. 30, 1909.

Original application filed October 27, 1908, Serial No. 459,773. Divided and this application filed January 20, 1909. Serial No. 473,331.

*To all whom it may concern:*

Be it known that I, CLARK J. SMITH, residing at Ottumwa, in the county of Wapello and State of Iowa, have invented certain new and useful Improvements in Wire-Working Implements, of which the following is a specification.

This application, which forms a divisional part of my co-pending application filed October 27, 1908, Serial No. 459,773, relates to an improved implement for applying a preformed wire fastening to hose pipe couplings and the like, and the invention embodies a frame, a reciprocating carriage, and means for gripping a wire to hold the same while fastening it to a hose coupling, the frame having an anvil or saddle portion for the wire, whereby when the same is drawn taut by the reciprocation of the carriage, the wire will be tightly drawn on the coupling and a slight twist of either the coupling or the implement will suffice to bend the wire enough to retain it in place until the implement is released from the wire, after which the ends of the wire may be hammered down in the usual manner.

My invention also resides in those novel details of construction, combination and arrangement of parts, all of which will be first fully described, then be specifically pointed out in the appended claims, and illustrated in the accompanying drawings, in which:

Figure 1, is a perspective view of my invention. Figs. 2 and 3, are central, vertical longitudinal sections thereof showing the manner of applying my invention. Fig. 4, is a plan view thereof. Fig. 5, is a rear elevation of my implement. Fig. 6, is a perspective view of the frame. Fig. 7, is a perspective view of the carriage. Fig. 8, is a detail perspective view of one end of the carriage.

Referring now to the accompanying drawings, in which like letters and numerals of reference indicate like parts in all of the figures 1 designates the main frame which is provided with a T-shape channel formed by the bottom $1^b$, sides $1^a$ and the bent over top edges $1^c$.

At the rear the main frame is provided with a back plate $1^k$, which carries a saddle $1^m$ that has a groove $1^n$ for a purpose hereinafter more fully described, and the back plate $1^k$ is provided with longitudinal alining apertures $1^p$, through which the ends of the wire $w$ may be passed.

The main frame 1 has ears $1^h$ through which the pivot $4^a$ of the lever 4 passes, the lever 4 being provided with a gear segment $4^b$ to mesh with the rack teeth $2^a$ so that as the lever 4 is manipulated to turn the segment $4^b$ on its axis the carriage 2 will be reciprocated in the frame 1.

At the rear the carriage 2 has grooves $2^f$ and a bearing lug $2^e$ to which a cam grip lever 3 is pivoted at $3^a$. The lever 3 has serrated cam surfaces $3^b$ to enter the grooves $2^f$. The grooves $2^f$, it should be understood, aline with the apertures $1^p$ in the back plate $1^k$ of the frame 1, so that when the wires are projected through the apertures $1^p$, they will project into the grooves $2^f$ and may be gripped by the cam lever, as shown in Fig. 2, of the drawings.

In the practical application of my invention, after the wire $w$ has been formed into a U-shape, in any approved manner it is bent around the hose coupling in the usual way with the ends projected through the loop. The ends of the wire are then passed through the apertures $1^p$ and clamped by the clamp 3, after which the lever 4 is brought down to move the carriage forward. This brings the portion $w'$ of the wire $w$ into the saddle $1^n$ and as the carriage moves forwardly the wire will be tightly drawn around the coupling. As soon as the wire has been drawn taut the coupling is rolled around with relation to the saddle $1^n$ until the wire is bent to hold it from slipping, after which the wire is released from the clamp 3, and bent down by using the implement as a hammer, in the usual manner.

What I claim is:—

1. In a wire working implement, a main frame and a carriage slidable therein together with means for reciprocating the carriage and a wire clamp carried by the carriage, said main frame having a saddle portion at one end to engage the wire and form an abutment therefor and having apertures to permit passage of the ends of the wire to be engaged by the clamp.

2. A wire working implement comprising a main frame, a carriage slidable therein and having a rack surface, a lever pivoted in the main frame and having a gear segment to coöperate with said rack surface, a clamping member mounted on one end of the carriage, said carriage having grooves adjacent to said clamping member to receive the ends of a wire, said main frame having apertures to permit passage of the ends of said wire, all being arranged so that as the carriage is reciprocated in one direction the wire will be drawn taut.

3. A wire working implement comprising a main frame, a carriage slidable therein and having a rack surface, a lever pivoted in the main frame and having a gear segment to coöperate with said rack surface, a clamping member mounted on one end of the carriage, said carriage having grooves adjacent to said clamping member to receive the ends of a wire, said main frame having apertures to permit passage of the ends of said wire, all being arranged so that as the carriage is reciprocated in one direction the wire will be drawn taut, and an anvil formed on said main frame adjacent to said apertures and having a saddle portion to receive a part of said wire.

CLARK JAMES SMITH.

Witnesses:
W. A. WORK,
EMMET A. WORK.